C. Disston,
Potato Parer.
Nº 28,973.  Patented July 3, 1860.
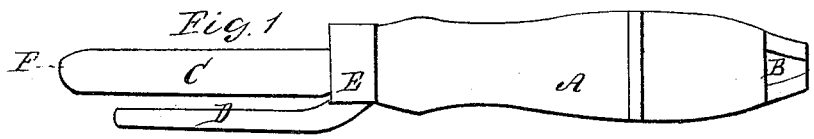
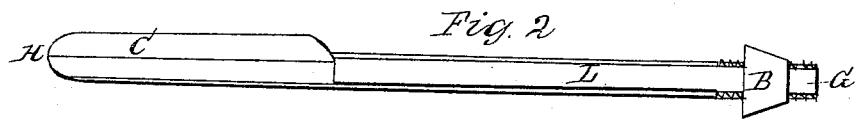
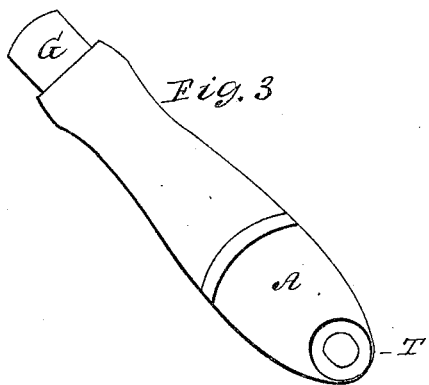
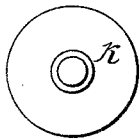
Witnesses:
C. Theodore Shoemaker
James Feather
Inventor:
Charles Disston

UNITED STATES PATENT OFFICE.

CHARLES DISSTON, OF PHILADELPHIA, PENNSYLVANIA.

POTATO-PARER.

Specification of Letters Patent No. 28,973, dated July 3, 1860.

*To all whom it may concern:*

Be it known that I, CHARLES DISSTON, of Philadelphia, in the county of Philadelphia and State of Pennsylvania, have invented a new and useful Improvement in Potato-Parers; and I do hereby declare that the following is a full, clear, and exact description thereof, reference being had to the accompanying drawing, through letters of reference marked thereon, forming part of this specification, and in which—

Figure 1, represents my improved parer; Fig. 2, the blade with shank, screw and nut; Fig. 3, view of handle showing the longitudinal hole therein; Fig. 4, view of top of ferrule showing the milling around the hole.

My invention consists in extending the shank of the blade entirely through the handle with a nut on the end to tighten the blade against a milled ferrule and thus secure it at any desired angle with the guard.

To enable others to make and use my invention I will describe its construction and operation.

The handle (A) is bored longitudinally through its center (I′) and has a ferrule or cap (E) fitted tightly on the upper end (I). The face (K) of this ferrule has a hole corresponding in size with the hole in the handle and the shank (L), of the blade (C), which passes through it. The edge of this hole is beveled at an angle with the face of the ferrule and milled finely on the bevel. To the periphery of this ferrule is attached a guard (D) nearly as long as the blade (C), by which the thickness of the paring is regulated; the shank of the blade is passed through the hole in the ferrule and handle, and the nut (B) screwed on the end to secure it in its place.

To adjust the edge of the blade for use loosen the nut (B) a little and push the shank up to release the bottom end of the blade from the milled notches on the face of the ferrule, then turn the edge of the blade to the desired distance from the guard, which regulates the thickness of the paring to be cut, and tighten the nut (B) when the lower end of the blade will be held by the milling, and thus prevented from turning.

The great advantage in this over other parers in use is, that the blade can be adjusted with greater nicety, and without risk of cutting the fingers in that operation; it is also more durable and can be constructed at less cost.

Having thus described my invention, what I claim as new and desire to secure by Letters Patent is—

The method herein described of adjusting the blade to the guard by means of the milled ferrule in combination with the nut (B) on the shank of the blade substantially as set forth.

CHARLES DISSTON.

Witnesses:
C. THEODORE SHOEMAKER,
JAMES F. CATHEN.